US009667987B2

(12) United States Patent
Liu et al.

(10) Patent No.: US 9,667,987 B2
(45) Date of Patent: May 30, 2017

(54) USING MULTIPLE PREDICTION SETS TO ENCODE EXTENDED UNIFIED DIRECTIONAL INTRA MODE NUMBERS FOR ROBUSTNESS

(75) Inventors: Lingzhi Liu, San Jose, CA (US);
Guichun Li, Santa Clara, CA (US);
Nam Ling, San Jose, CA (US);
Jianhua Zheng, Shenzhen (CN);
Chenxiong Zhang, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 1092 days.

(21) Appl. No.: 13/416,766

(22) Filed: Mar. 9, 2012

(65) Prior Publication Data

US 2012/0230403 A1    Sep. 13, 2012

Related U.S. Application Data

(60) Provisional application No. 61/451,432, filed on Mar. 10, 2011.

(51) Int. Cl.
*H04N 19/467*   (2014.01)
*H04N 19/11*    (2014.01)
*H04N 19/157*   (2014.01)
*H04N 19/176*   (2014.01)
(Continued)

(52) U.S. Cl.
CPC .......... *H04N 19/467* (2014.11); *H04N 19/11* (2014.11); *H04N 19/157* (2014.11); *H04N 19/176* (2014.11); *H04N 19/463* (2014.11); *H04N 19/593* (2014.11)

(58) Field of Classification Search
CPC ...... H04N 19/61; H04N 19/176; H04N 19/46; H04N 19/105; H04N 19/51; H04N 19/70; H04N 19/593; H04N 19/172; H04N 19/00781
See application file for complete search history.

(56) References Cited

U.S. PATENT DOCUMENTS

| 2008/0111721 A1* | 5/2008 | Reznik ................. H03M 7/40 341/67 |
| 2009/0175334 A1* | 7/2009 | Ye et al. .................. 375/240.12 |
| 2011/0038414 A1* | 2/2011 | Song et al. .............. 375/240.12 |

OTHER PUBLICATIONS

Li, et al, " CE6.A.5: Santa Clara University and Hisilicon Report on Block Based Intra Prediction," Joint Collaborative Team on Video Coding (JCT-VC) of ITU-T SG16 WP3 and ISO/IEC JTC1/SC2/WG11, 4th Meeting: Daegu, KR, Jan. 20-28, 2011, Document: JCTV-D026, 6 pages.

(Continued)

*Primary Examiner* — Frederick Bailey
*Assistant Examiner* — Farhan Mahmud
(74) *Attorney, Agent, or Firm* — Conley Rose, P.C.

(57) ABSTRACT

An apparatus comprising a codec configured to predict an intra mode for a considered pixel block based on a plurality of coded intra modes for a plurality of adjacent pixel blocks to the considered pixel block, wherein the predicted intra mode and the coded intra modes correspond to a set of intra-frame modes that comprise a plurality of directional intra modes and at least two non-directional intra modes and that are assigned a plurality of corresponding group numbers and group index numbers, and wherein the intra mode is predicted based on the group numbers and group index numbers of the coded intra modes.

14 Claims, 5 Drawing Sheets

(51) Int. Cl.
H04N 19/463 (2014.01)
H04N 19/593 (2014.01)

(56) References Cited

OTHER PUBLICATIONS

Liu, "Multiple Predictor Sets for Intra Coding," Joint Collaborative Team on Video Coding (JCT-VC) of ITU-T SG16 WP3 and ISO/IEC JTC1/SC29/WG11, 1st Meeting: Dresden, DE, Apr. 15-23, 2010, Document: JCTVC-A022, 10 pages.

Li, et al., "Integration of Plane Mode in Unified Intra Prediction," Joint Collaborative Team on Video Coding (JCT-VC) of ITU-T SG16 WP3 and ISO/IEC JTC1/SC29/WG11, 3rd Meeting: Guangzhou, CN, Oct. 7-15, 2010, Document: JCTVC-C111, 5 pages.

Kanumuri, et al, "Enhancements to Intra Coding," Joint Collaborative Team on Video Coding (JCT-VC) of ITU-T SG16 WP3 and ISO/IETC JTC1/SC29/WG11, 4th Meeting: Daegu, KR, Jan. 20-28, 2011, 7 pages.

Lainema, et al., "Planar Intra Coding for Improved Subjective Video Quality," Joint Collaborative Team on Video Coding (JCT-VC) of ITU-T SG16 WP3 and ISO/IEC JTC1/SC29/WG11, 4th Meeting: Daegu, KR, Jan. 20-28, 2011, Document: JCTVC-D326, 12 pages.

Jeon, "Non-Directional Intra Prediction for Coding Efficiency Improvement," Joint Collaborative Team on Video Coding (JCT-VC) of ITU-T SG16 WP3 and ISO/IEC JTC1/SC29/WG11, 4th Meeting: Daegu, KR, Jan. 20-28, 2011, Document: JCTVC-D083, 7 pages.

Li, et al, "Using MPS to Encode Extended UDI Mode Nos. For Robustness," Joint Collaborative Team on Video Coding (JCT-VC) of ITU-T SG16 WP3 and ISO/IEC JTC1/SC29/WG11, 5th Meeting: Geneva, CH, Mar. 16-23, 2011, Document: JCTVC-E113; 4 pages.

Foreign Communication From a Counterpart Application, PCT Application PCT/US2012/028533, International Search Report dated Jun. 18, 2012, 4 pages.

Foreign Communication From a Counterpart Application, PCT Application PCT/US2012/028533, Written Opinion dated Jun. 18, 2012, 11 pages.

* cited by examiner

USING MULTIPLE PREDICTION SETS TO ENCODE EXTENDED UNIFIED DIRECTIONAL INTRA MODE NUMBERS FOR ROBUSTNESS

CROSS-REFERENCE TO RELATED APPLICATIONS

This application claims the benefit of U.S. Provisional Application No. 61/451,432 filed on Mar. 10, 2011 by Lingzhi Liu et al., entitled "Using Multiple Prediction Sets to Encode Extended Unified Display Interface Mode Numbers for Robustness," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The amount of video data needed to depict even a relatively short film can be substantial, which may result in difficulties example when the data is to be streamed or otherwise communicated across a communications network with limited bandwidth capacity. Thus, video data is generally compressed prior to being communicated across modern day telecommunications networks. Video compression devices often use software and/or hardware at the source to code the video data prior to transmission, thereby decreasing the quantity of data needed to represent digital video images. The compressed data is then received at the destination by a video decompression device that decodes the video data. Improved compression/decompression techniques that increase compression ratios without substantially reducing image quality are desirable due to limited network resources.

SUMMARY

In one embodiment, the disclosure includes an apparatus comprising a codec configured to predict an intra mode for a considered pixel block based on a plurality of coded intra modes for a plurality of adjacent pixel blocks to the considered pixel block, wherein the predicted intra mode and the coded intra modes correspond to a set of intra-frame modes that comprise a plurality of directional intra modes and at least two non-directional intra modes and that are assigned a plurality of corresponding group numbers and group index numbers, and wherein the intra mode is predicted based on the group numbers and group index numbers of the coded intra modes.

In another embodiment, the disclosure includes a network component comprising a processor configured to predict an intra mode for a considered pixel block from a set of intra-frame modes comprising a plurality of directional intra modes and at least two non-directional intra modes arranged in a plurality of groups and indicated by a plurality of corresponding group numbers and group index numbers, wherein the intra mode of the considered pixel block is predicted based on the group numbers and group index numbers of a plurality of coded intra modes for a plurality of adjacent pixel blocks to the considered pixel block.

In yet another embodiment, the disclosure includes a method implemented by at least one codec component comprising predicting a group number for a considered block based on two other group numbers for two other intra modes of two adjacent blocks to the considered block, predicting a group index number for the intra mode of the considered block based on two other group index numbers for the two other intra modes for the two adjacent blocks, mapping the predicted group number and group index number to a predicted intra mode for the considered block from a set of intra-frame modes that comprises at least two non-directional intra modes and a plurality of directional intra modes.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Typically, video media involves displaying a sequence of still images or frames in relatively quick succession, thereby causing a viewer to perceive motion. Each frame may comprise a plurality of picture elements or pixels, each of which may represent a single reference point in the frame. During digital processing, each pixel may be assigned an integer value (e.g., 0, 1, . . . or 255) that represents an image quality or characteristic, such as luminance or chrominance, at the corresponding reference point. Typically, groups of pixels (macroblocks) within a single frame may be substantially correlated with other macroblocks within the same frame such that pixel values across some macroblocks may vary only slightly and/or exhibit repetitious textures. Modern methods of video-compression exploit these spatial correlations using various techniques which may be known collectively as intra-frame prediction. Intra-frame prediction may reduce spatial redundancies between adjacent and/or neighboring macroblocks (also referred to herein as blocks)

in the same frame, thereby compressing the video data without greatly reducing image quality. Different forms of intra-frame prediction have been described by various conventional video/image coding standards, such as International Telecommunications Union (ITU) Telecommunications Standardization Sector (ITU-T) H.264 (hereinafter, H.264) and International Organization for Standardization (ISO)/International Electrotechnical Commission (IEC) Moving Picture Experts Group (MPEG) 4 Visual, both of which are incorporated herein by reference as if reproduced in their entirety.

In practice, intra-frame predication may be implemented by video encoders/decoders (codecs) to interpolate a predicted block from one or more previously coded/decoded neighboring blocks, thereby creating an approximation of the current block. Hence, the encoder and decoder may interpolate the predicted block independently, thereby enabling a substantial portion of a frame and/or image to be reconstructed from the communication of a relatively few number of reference blocks, e.g., blocks positioned in (and extending from) the upper-left hand corner of the frame. However, intra-frame prediction alone does not reproduce an image of sufficient quality for modern video, and consequently an error correction message, e.g., a residual message, may be communicated between the encoder and decoder to correct differences between the predicted block and the current block. For instance, an encoder may subtract the predicted block from the current block to produce a residual block, which then may be transformed, quantized, and scanned before being coded into the coded data stream. Upon reception of the coded data stream, a decoder may add the reconstructed residual block to the independently generated predicted block to recreate the current block. Although the recreated current block may be an imperfect version of the original current block, e.g., due to the lossy nature of intra-frame coding compression, their differences may be so slight as to be virtually imperceptible to the human eye. Thus, substantial bit savings may be derived without noticeably reducing the quality of the reconstructed image.

The residual block may comprise differences between the predicted block and the current block, and therefore many of the residual block's discrete values, e.g., pixel data, may comprise zero and/or near-zero coefficients, e.g., in areas where the predicted block is identical and/or near-identical to the current block. Furthermore, transformation, quantization, and/or scanning of the residual block may remove many of the zero and/or near-zero coefficients from the data stream, thereby resulting in further compression of the video data. Consequently, coding efficiencies may result from more accurate predictions of the original image. To harness these coding efficiencies, conventional video/image coding standards may improve prediction accuracy by using a plurality of prediction modes during intra-frame prediction, e.g., each of which may generate a unique texture. An encoder may select the prediction mode that generates the most accurate prediction for each current block, and consequently may make more accurate predictions (on average) than other encoders that may use fewer prediction modes. For instance, recent research has shown that conventions using 36 intra-frame prediction modes may more accurately predict complex textures than conventions using fewer prediction modes, such as H.264, which uses only 9 intra-frame prediction modes. The intra-frame prediction modes are also referred to herein as intra modes, prediction modes, and predictors interchangeably. However, the encoder and decoder must use the same prediction mode when independently generating a predicted block, and thus the encoder, in some instances, may be required to communicate the selected prediction mode in the overhead of the data stream, e.g., when the selected prediction mode does not match the predicted prediction mode. As a result, increasing the number of prediction modes during intra-frame prediction may result in greater amounts of overhead, e.g., in terms of transmitted bits, thereby reducing (or in some cases eliminating) the bit savings achieved from the increased prediction accuracy.

For instance, a codec using a single prediction mode, e.g., a Direct Current (DC) prediction mode, may not require any overhead bits to communicate the prediction mode because the prediction mode remains fixed, and is therefore known by the decoder. Alternatively, a codec using 9 possible prediction modes (e.g., mode-zero, mode-one, . . . , mode-eight) may require four bits of overhead to directly communicate the selected prediction mode to the encoder. Then again, a codec using 35 possible prediction modes may require six bits of overhead to directly communicate the selected prediction mode to the encoder. Four (or six) bits of overhead per block may constitute a substantial amount of overhead over the course of an entire frame and/or sequence of frames, and may significantly decrease coding efficiency. Hence, in some cases the bit savings that result from increased prediction accuracy may be partially (or completely) offset by the additional overhead required to communicate the additional prediction mode combinations.

To reduce the bit cost associated with increased prediction mode combinations, modern video codecs may attempt to predict the prediction mode of the current block based on the prediction modes of one or more neighboring blocks. For instance, if a neighboring block directly above the predicted block has a vertical prediction mode, the codec may predict that the prediction mode corresponding to the current block may also be vertical. Further, if the selected prediction mode matches the predicted prediction mode, then the codec (e.g., the encoder) may clear a flag. Otherwise, the codec may set the flag. Importantly, the selected prediction mode is only coded if the prediction is incorrect. Thus, only one bit of overhead, e.g., one flag bit, may be transmitted when the prediction is correct, thereby resulting in an overhead bit savings of two bits, e.g., versus direct communication of the prediction mode. Alternatively, four bits of overhead, e.g., one flag bit and three bits indicating the correct prediction mode, may be transmitted when the prediction is incorrect, thereby resulting in an overhead bit cost of one bit, e.g., versus direct communication of the prediction mode. Consequently, predicting the prediction mode may result in an overhead savings if the prediction is correct and an overhead cost if the prediction is incorrect.

Codecs utilizing 9 possible prediction modes are frequently, e.g., more often than not, able to correctly predict the selected prediction mode, and thus the single layer prediction method described above tends to be relatively effective in reducing overhead cost. On the other hand, the overall probability that a codec will correctly predict the selected prediction mode decreases as additional prediction modes are used, and thus coding efficiencies may suffer and/or diminish accordingly. For instance, codecs using 35 prediction mode combinations (e.g., mode-one, mode-two, . . . mode-thirty-five) may be less likely to correctly predict the selected prediction mode, e.g., because the ratio of correct answers to incorrect answers decreases proportionally to the number of possible prediction modes.

For luminance blocks, the High Efficiency Video Coding (HEVC) video compression standard, also referred to as HEVC, introduces a total of 34 intra modes for coding blocks. The 34 intra modes include 33 directional modes and one non-directional mode, which may be an intra DC mode. As described above, this may produce a higher accuracy of prediction on blocks with complex texture, but more bits may be required in the bit stream to represent prediction modes.

To improve the intra-frame prediction accuracy, a multiple prediction sets (MPS) scheme may be used. A MPS scheme may reduce bit rate and improve coding efficiency in video compression systems. In MPS, the prediction modes (also referred to herein as predictors) may be grouped into multiple groups. During encoding and decoding processes, the intra mode used by the current block may be predicted from the adjacent blocks more accurately, hence saving the bits to represent the intra mode. Each prediction mode may be represented by a group number and an index number in the group (or group index number), which may be transmitted if needed instead of the intra mode number. Based on a group number and group index number, the current block's prediction mode may be predicted based upon the coded spatially adjacent blocks. This scheme may save bits for coding the prediction modes. The scheme may be used for the 34 modes in TMuC, which may be grouped into four groups, as described below.

In HEVC, unified directional intra (UDI) prediction uses 34 modes, which may include 33 directional modes and one non-directional mode. It has also been reported that using additional non-directional modes may further improve the coding gain and the subjective quality. For example, a Planar mode may be used as an additional non-directional intra prediction mode. The CE6.e of the 4th JCTVC meeting tested several different implementations of intra Planar mode. In subtest e3.b, Mode 2 is used to signal both the mode DC and Planar. When Mode 2 is signaled, an additional flag is sent to indicate whether the mode is DC or Planar. Whether to decode the DC/Planar flag is decided by the current decoded intra mode number. If the intra mode number is 2, then one more bit may be parsed. Otherwise, the next one bit is not parsed. This method has two problems or issues.

First, in some applications, e.g., storage and video surveillance, a decoder may only be required to check whether the bit stream is corresponding to the standard. Because current intra prediction mode is predicted from its neighboring blocks, to decide whether the bit of mode number needs to be decoded or not, the system may have to store at least all the decoded intra prediction modes of a entire block-line. This may cause additional storage requirement for the decoding system. Further, in H.264, the number of bits that are to be decoded for an intra prediction mode may not be related to the decoded value of the modes of neighboring blocks. In current implementation, because whether or not decoding this bit is related to the current decoded intra prediction mode, and the current decoded mode is related to the mode number of top and left neighboring blocks, this signaling method has some error resilience problems. For example, when the mode of the upper block is wrongly decoded (e.g., mode 2 is decoded as mode 3) and the mode of the left block is 4, and if the current mode is either DC or Planar, then the decoder may decide not to decode another bit for DC and Planar flag and treat the bit as the next syntax. This may cause a serious problem, such as decoder crash.

Disclosed herein is a system and method to use the MPS to support more intra prediction modes when there are two or more non-directional modes. Using the MPS may avoid the problems described above since the bit length of MPS syntax is not decided by any content of previous blocks. Specifically, using MPS for UDI modes may eliminate the need to use an extra bit to indicate a DC or Planar mode. Instead, each of the two non-directional modes may have a mode number, which may be indicated by a group number and a group index number. The MPS intra prediction may have a similar Bjontegaard Delta (BD) rate of the current intra prediction method in in H.264, and may not have the mode storage requirements and error resistance problem of current implementations. Thus, using the MPS method may lower the storage requirements of the system and improve the error robustness of intra prediction in comparison to current implementations.

Figure 1:
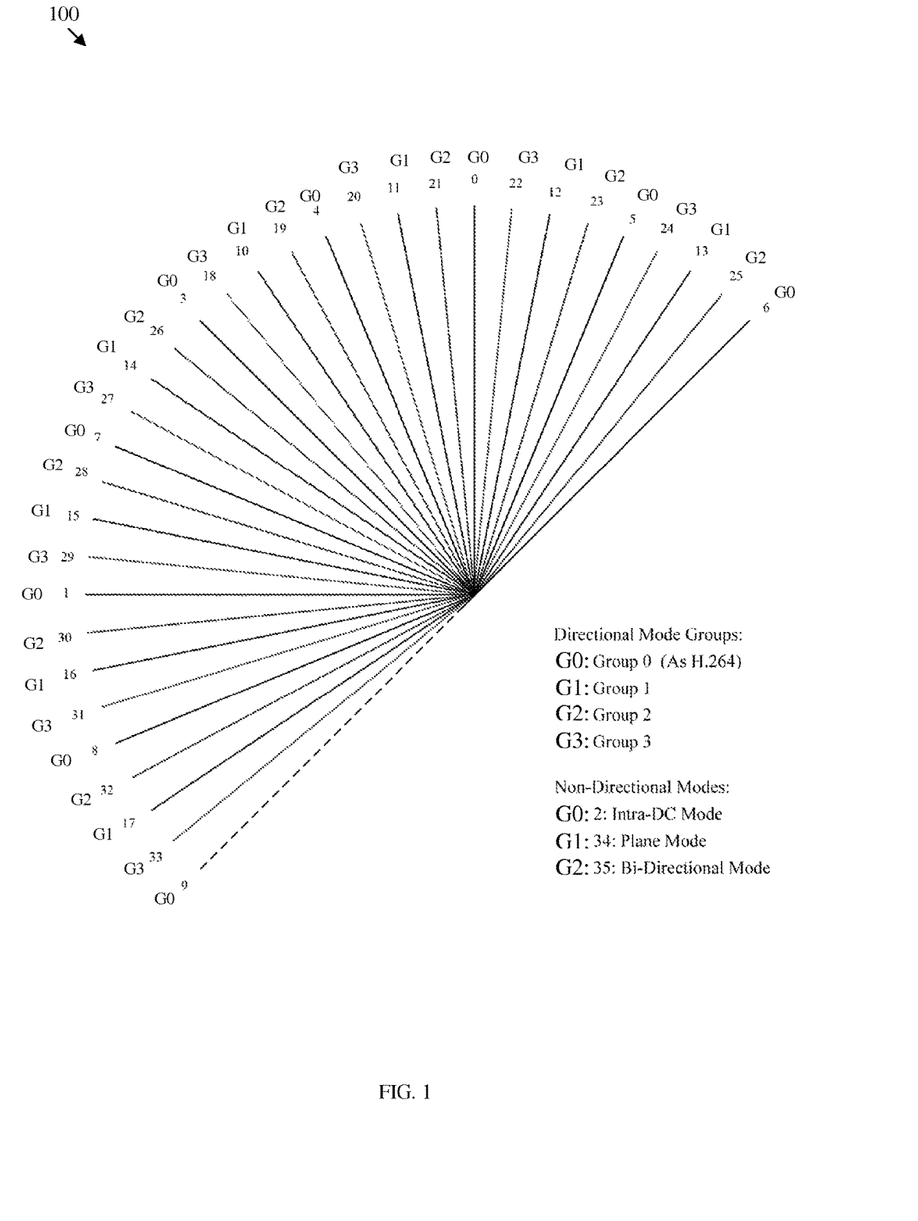
FIG. 1 is a schematic diagram of an embodiment of intra modes in multiple predictor sets.

FIG. 1 illustrates an embodiment of intra modes 100 in multiple predictor sets. The intra modes 100 may comprise about 36 prediction modes, which may include the TMuC prediction modes. The intra modes 100 may comprise directional modes and non-directional modes that may be used in intra-frame prediction. The intra modes 100 may be grouped into about 4 groups (G0, G1, G2, and G3), where each group may comprise about 9 prediction modes. Each group may be represented by a group number (e.g., from 0 to 3) and each prediction mode in a group may be represented by a group index number (e.g., from 0 to 8). A first group (G0) may comprise the same predictors as H.264/Advanced Video Coding (AVC). The remaining groups (G1, G2, and G3) may be obtained by rotating the first group (G0) for a determined angle, e.g., π/32 in FIG. 1. The non-directional modes may comprise the DC or Intra-DC Mode in G0 (with group index number 2), a Planar Mode in G1 (with group index number 34), and a Bi-Directional Mode in G2 (with group index number 35). Using more non-directional modes may produce more accurate intra-frame predictions.

Each of the prediction modes above may be identified by the designated group number and group index number. Table 1 shows one embodiment of the group numbers and group index numbers assigned to each prediction mode. The rows correspond to the 4 groups, where each row represents a group number (e.g., from 0 to 3). The columns correspond to the 9 prediction modes in each group, where each column represents a group index number (e.g., from 0 to 8). The entries in Table 1 correspond to the different prediction modes and represent the intra mode numbers. The group number (row number) and the group index number (column number) may be used to represent the corresponding intra mode number. For example, mode number 0 may be represented by group number 0 and group index number 0, and mode number 31 may be represented by group number 3 and group index number 8.

TABLE 1

Group numbers and group index numbers for multiple intra modes.

| Group Number | Group Index Number | | | | | | | | |
|---|---|---|---|---|---|---|---|---|---|
| | 0 | 1 | 2 | 3 | 4 | 5 | 6 | 7 | 8 |
| 0 | 0 | 1 | 2 | 3 | 4 | 5 | 6 | 7 | 8 |
| 1 | 11 | 16 | 34 | 14 | 10 | 12 | 13 | 15 | 17 |
| 2 | 22 | 30 | 35 | 18 | 19 | 23 | 25 | 28 | 9 |
| 3 | 21 | 29 | 32 | 26 | 20 | 24 | 33 | 27 | 31 |

Table 2 shows another embodiment of group numbers and group index numbers, which may be used for UDI mode numbers in MPS, where more than 34 intra predictors are used. The mode numbers are grouped into at least 4 sets, with 9 mode numbers (for 9 predictors or prediction modes)

in each. Each mode is represented by a group number and a group index number. The basic group, group 0, comprises the 9 basic prediction modes as in H.264/AVC. Mode 2 may be the DC mode and mode 34 may be the Planar mode as proposed in JCTVC-D235 meeting.

TABLE 2

UDI mode numbers in MPS (for 34 + Extra modes).

| Group Number | Group Index Number | | | | | | | | |
|---|---|---|---|---|---|---|---|---|---|
| | 0 | 1 | 2 | 3 | 4 | 5 | 6 | 7 | 8 |
| 0 | 0 | 1 | 2 | 3 | 4 | 5 | 6 | 7 | 8 |
| 1 | 11 | 16 | 34 | 14 | 10 | 12 | 13 | 15 | 17 |
| 2 | 22 | 30 | 35 | 18 | 19 | 23 | 25 | 28 | 9 |
| 3 | 21 | 29 | 36 | 26 | 20 | 24 | 33 | 27 | 31 |
| 4 | | | | | | | | | 32 |

Table 3 shows another embodiment for assigning UDI modes in MPS, which may be used for 4×4 prediction units (PUs) or prediction blocks, where more than 17 modes (17+extra modes) are needed. In order to reduce the overhead, in the 4×4 case, the predictors are grouped into 4 sets, with 5 modes in each. Each mode is also represented by a group number and group index number.

TABLE 3

UDI mode numbers in MPS (for 17 + Extra modes).

| Group Number | Group Index Number | | | | |
|---|---|---|---|---|---|
| | 0 | 1 | 2 | 3 | 4 |
| 0 | 0 | 1 | 2 | 3 | 4 |
| 1 | 5 | 16 | 34 | 7 | 12 |
| 2 | 11 | 8 | 35 | 14 | 10 |
| 3 | 13 | 9 | 36 | 15 | 6 |

Figure 2:
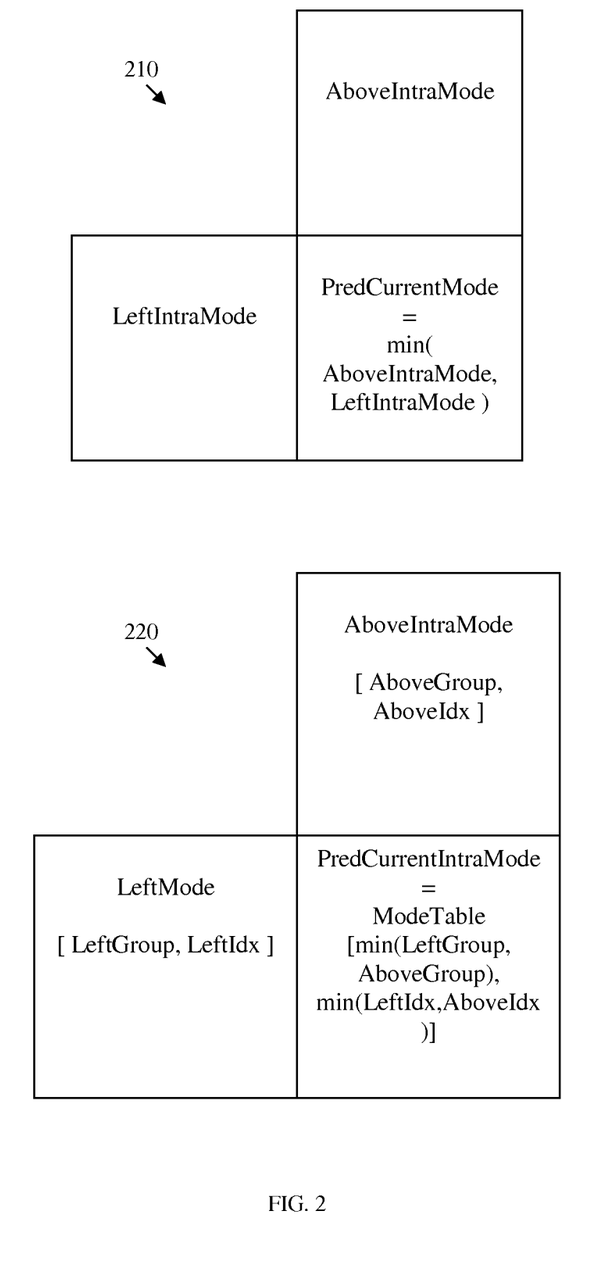
FIG. 2 is a schematic diagram of an embodiment of intra mode prediction schemes.

As described above, improving the efficiency of predicting the intra modes becomes more important or advantageous as the number of used intra modes (or predictors) increases. FIG. 2 shows one MPS intra-frame prediction method 210 that is used in TMuC (e.g., TMuC 0.7). Specifically, an intra mode for encoding/decoding a current block is predicted as the minimum value between a first intra mode number that was used for encoding/decoding a first block above the considered block and a second intra mode number that was used for encoding/decoding a second block to the left of the considered block. In the case where any of the first block (above the considered block) and the second block (to the left of the considered block) is not available, the intra mode for the considered block may be set to the DC mode. Such intra mode prediction method may be represented as:

PredCurrentMode=Min(AboveIntraMode,LeftIntraMode), where PredCurrentMode is the predicted intra mode for the considered block, AboveIntraMode is the first intra mode used for the first (top) block, and LeftIntraMode is the second intra mode used for the second (left) block. One disadvantage of this method is that when the predicted intra mode is not the actual intra mode that was used to code the block (e.g., at the encoder), then the actual intra mode number used for encoding should be sent and included in the bit stream to the decoder. The encoder may determine whether to send the intra mode number to the decoder based on whether the predicted intra mode matches the actual used intra mode. When the number of modes is large, such as in TMuC, sending the intra mode numbers in the bit stream may increase the overhead (e.g., bandwidth usage).

FIG. 2 also illustrates an embodiment of another or alternative MPS intra-frame prediction method 220 that may be used, e.g., in TMuC, to reduce the overhead based on the group number and the group index number of the predicted mode. The group number and the group index number corresponding to the actual intra mode number that is used for encoding may be sent instead of the actual intra mode number in the case where the predicted intra mode does not match the actual intra mode used for the considered block. In the case where any of the top block and the left block is not available, the intra mode for the considered block may be set to the DC mode, similar to the currently used method above. On average, the total bits in the group number may be fewer than the total bits in the intra mode number. This saving in the transmitted bit stream may further increase as more intra modes are used for intra-frame prediction.

Specifically, the group number of the intra mode for the considered block is predicted as the minimum value between a first group number for the intra mode used for the top block above the considered block and a second group number for the intra mode used for the left block to the considered block. Similarly, the group index number of the intra mode for the considered block is predicted as the minimum value between a first group index number for the intra mode of the top block and a second group index number for the intra mode of the left block. The indicated group number and group index number may then be used to obtain the intra mode number, for instance using Table 1 or similar mapping data structures. This intra mode prediction method may be represented as:

PredCurrentMode=ModeTable[Min(AboveGroup, LeftGroup),Min(AboveIdx,LeftIdx)], where AboveGroup is the group number of the intra mode used for the top block, LeftGroup is the group number of the intra mode used for the left block, AboveIdx is the group index number of the intra mode used for the top block, and LeftInx is the group index number of the intra mode used for the left block.

In the disclosed method above, the current group number CurrentGroup corresponding to the actual intra mode used for the considered block (e.g., at the encoder) may be predicted as PredCurrentGroup=Min(AboveGroup,LeftGroup).

The prediction result may correspond to one of two cases:
1) If CurrentGroup is equal to PredCurrentGroup, then one bit set "1" may be coded and sent in the bit stream (from encoder to decoder). This may indicate a match between CurrentGroup and PredCurrentGroup, where there is no need to indicate the predicted intra mode for the decoder since the decoder may successfully predicted the actual intra mode for the block.
2) If CurrentGroup is not equal to PredCurrentGroup, then one bit set to "0" may be first coded. This may indicate no match between CurrentGroup and PredCurrentGroup, and hence the group number (instead of the intra mode number) should be coded and indicated to the decoder in the bit stream. In some embodiments, the group index number may also be coded and indicated in the bit stream. However, sending the group index number with the group number may increase overload. To code the current group number CurrentGroup for the actual intra mode used for the block, the following formula may be implemented:

CurrentGroup=CurrentGroup>PredCurrentGroup? CurrentGroup−1:CurrentGroup.

The result may be coded into the bit stream.

As described in the scenario of FIG. 1, there may be 4 groups for the 36 prediction modes (in TMuC). If CurrentGroup is not equal to PredCurrentGroup at the encoder side, a "0" value bit may be first coded to indicate a mismatch. The encoder may then code CurrentGroup according to:

CurrentGroup=CurrentGroup>PredCurrentGroup?
CurrentGroup−1:CurrentGroup.

As such, if CurrentGroup=0, then a bit set to "1" may be coded in the bit stream, after the bit "0". If CurrentGroup=1 or 2, then two bits "00" or "01", respectively, may be coded. At the decoder side, the decoder may first decode the "0" bit, and then if the next decoded bit is "1", the decoder may obtain CurrentGroup=0. Otherwise, if the next decoded bit is "0", the decoder may also decode one more bit in the bit stream. If the one more decode bit after the "0" bit is "0", then the decoder may obtain CurrentGroup=1. Otherwise, if the one more decode bit after the "0" bit is "1", then the decoder may obtain CurrentGroup=2. The CurrentGroup value may then be decoded by the decoder according to the equation:

CurrentGroup=CurrentGroup>=PredCurrentGroup?
CurrentGroup+1:CurrentGroup.

This encoding/decoding scheme may not increase the complexity of implementation in the encoder/decoder and may be implemented without substantial change of the current prediction method in TMuC.

In order to test the performance of utilizing multiple non-directional modes, additional non-directional modes may be used with MPS (for example, as proposed in JCTVC-E289). In the MPS mode tables, the mode number for this predictor is 35. Simulations using the MPS method are applied for Context-based Adaptive Binary Arithmetic Coding (CABAC) entropy coding, where Intra High Efficiency (HE) was tested to evaluate the performance.

Table 4 and Table 5 show testing results of Intra HE configuration. Table 4 shows results using MPS intra extended UDI modes with Planar mode (in addition to DC mode). Table 5 shows results using MPS intra extended UDI modes with both Planar mode and 2×2 Sub-block based intra mode (in addition to DC mode). The 2×2 Sub-block based intra mode may also be referred to as a Bi-directional mode. The testing results show the average coding percentage gains on a plurality of resolution classes (Classes A, B, C, D, and E) for three BD rates (Y BD-rate or luminance, U BD-rate, and V BD-rate). The percentage gains using the additional non-directional Planar mode are found to improve when the 2×2 Sub-block based intra mode is also used. For example, the MPS method provides about 0.6% gain for Y BD-rate using Planar mode, and further about 0.9% gain using both Planar mode and 2×2 Sub-block based intra mode. Since the Planar mode and the 2×2 Sub-block based mode may have some overlap, the improvement in performance of the combination of the two modes may not be exactly additive. Using MPS, the encryption (Enc) and decryption (Dec) times are increased by relatively small amounts (around 103%). However, the Dec time using both Planar mode and 2×2 Sub-block based intra mode may be significant (around 130%).

In comparison, Table 6 and Table 7 show testing results for the same classes and BD rates using the JCTVC-D235 signaling method for distinguishing the DC/Planar modes (using one mode number (Mode 2) and a bit flag). Table 6 shows results using D235 Planar mode (with DC mode) in the D235's signaling method. Table 7 shows results using the 2×2 Sub-block based mode (with DC mode) in the D235's signaling method. The percentage gains using the Planar mode are found slightly better than the case of the MPS method in Table 5. However, the percentage gains using the 2×2 Sub-block based mode are slightly worse than the case of the MPS method in Table 6. This indicates that the gain may increase using the MPS method as the number of considered non-directional modes increases.

TABLE 4

MPS intra extended UDI with Planar mode.

| | Intra High Efficiency | | |
|---|---|---|---|
| | Y BD-rate | U BD-rate | V BD-rate |
| Class A | −0.6% | −0.2% | −0.1% |
| Class B | −0.7% | −0.3% | −0.4% |
| Class C | −0.4% | −0.1% | −0.1% |
| Class D | −0.3% | 0.0% | 0.0% |
| Class E | −0.8% | −0.5% | −0.1% |
| All | −0.6% | −0.2% | −0.2% |
| Enc Time [%] | | 102% | |
| Dec Time [%] | | 100% | |

TABLE 5

MPS intra extended UDI with Planar mode and 2 × 2 Sub-block based mode.

| | Intra High Efficiency | | |
|---|---|---|---|
| | Y BD-rate | U BD-rate | V BD-rate |
| Class A | −1.0% | −0.4% | −0.2% |
| Class B | −1.1% | −0.5% | −0.6% |
| Class C | −0.6% | −0.3% | −0.1% |
| Class D | −0.5% | −0.1% | −0.1% |
| Class E | −1.1% | −0.6% | −0.1% |
| All | −0.9% | −0.4% | −0.2% |
| Enc Time [%] | | 103% | |
| Dec Time [%] | | 130% | |

TABLE 6

D235 Planar mode with D235's signaling method.

| | Intra High Efficiency | | |
|---|---|---|---|
| | Y BD-rate | U BD-rate | V BD-rate |
| Class A | −0.7% | 0.1% | 0.3% |
| Class B | −0.8% | −0.3% | 0.3% |
| Class C | −0.5% | −0.1% | 0.0% |
| Class D | −0.5% | 0.0% | 0.1% |
| Class E | −0.9% | −0.2% | 0.2% |
| All | −0.7% | −0.1% | 0.0% |
| Enc Time [%] | | 107% | |
| Dec Time [%] | | 100% | |

TABLE 7

2 × 2 Sub-block based mode with D235's signaling method.

| | Intra High Efficiency | | |
|---|---|---|---|
| | Y BD-rate | U BD-rate | V BD-rate |
| Class A | −0.6% | 0.0% | 0.3% |
| Class B | −0.6% | −0.1% | −0.2% |
| Class C | −0.5% | 0.0% | 0.1% |
| Class D | −0.5% | 0.1% | 0.2% |
| Class E | −0.5% | −0.1% | 0.4% |

TABLE 7-continued

2 × 2 Sub-block based mode with D235's signaling method.

| | Intra High Efficiency | | |
|---|---|---|---|
| | Y BD-rate | U BD-rate | V BD-rate |
| All | −0.5% | 0.0% | 0.1% |
| Enc Time [%] | | 104% | |
| Dec Time [%] | | 99% | |

Figure 3:
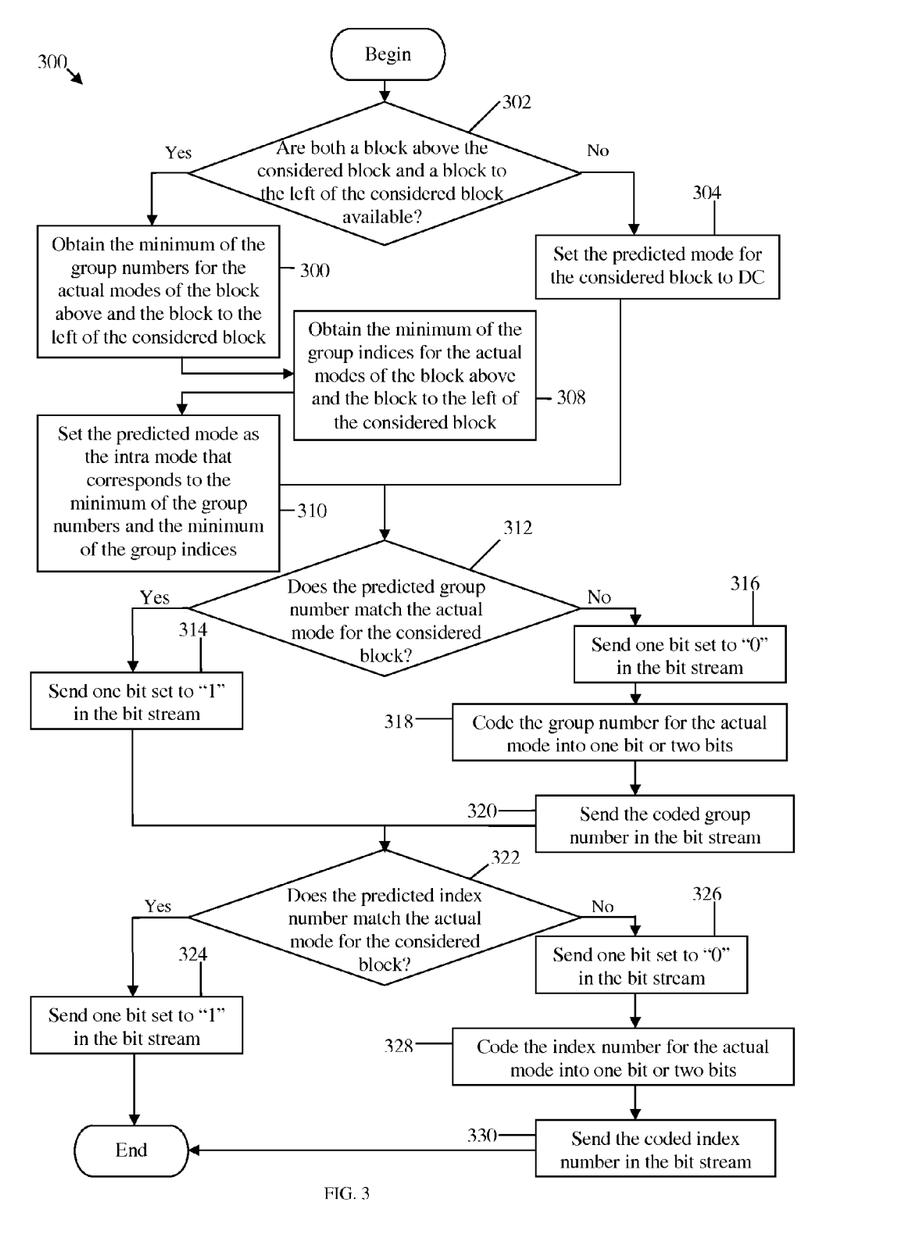
FIG. 3 is a flowchart of an embodiment of an intra mode prediction method.

FIG. 3 illustrates a flow chart of one embodiment of a MPS method 300 that is based on the group number and group index number. The MPS method 300 may be used to improve the coding gain for sent intra modes (from encoder to decoder) and hence reduce overload in the bit stream. For instance, the method 300 may be implemented at the encoder. The method 300 may begin at block 302, where the method 300 may determine whether both a block above the considered block and a block to the left of the considered block are available. If the condition in block 302 is true, then the method 300 may proceed to block 306. Otherwise, the method 300 may proceed to block 304. At block 304, the predicted mode for the considered block may be set to DC, e.g., in the case where the block above and/or the block to the left of the considered block are not available. Alternatively at block 306, the minimum of the group numbers for the actual modes of the block above and the block to the left of the considered block may be obtained. At block 308, the minimum of the group index numbers for the actual modes of the block above and the block to the left of the considered block may be obtained. At block 310, the predicted mode may be set as the intra mode that corresponds to the minimum of the group numbers and the minimum of the group index numbers. For instance, a mapping table similar to Table 1 or any data structure may be used to implement the mapping.

Next at block 312, the method 300 may determine whether the predicted group number matches the actual group number for the considered block. If the condition in block 312 is true, then the method 300 may proceed to block 314. Otherwise, the method 300 may proceed to block 316. At block 314, one bit set to "1" may be sent in the bit stream. This may indicate to the decoder that the predicted group number matches the actual group number for the considered block. In this case, there may be no need to specify the predicted group number to the decoder since the decoder may be able to predict the intra mode for the considered block successfully. The method 300 may then proceed to 322. Alternatively at block 316, one bit set to "0" may be sent in the bit stream. This may indicate to the decoder that the subsequent bit(s) in the bit stream specify the actual group number for the considered block. At block 318, the group number for the actual mode may be coded into one or two bits, as described above. At block 320, the coded group number may be sent into the bit stream. For example, using the formula above to code CurrentGroup, one bit may be set to "1" if CurrentGroup is G0, or two bits may be set to "00" if CurrentGroup is G1, to "01" if CurrentGroup is G2. The method 300 may then proceed to 322. In other embodiments, different bit values than described above may be used to code the group number.

Next at block 322, the method 300 may determine whether the predicted group index number matches the actual group index number for the considered block. If the condition in block 322 is true, then the method 300 may proceed to block 324. Otherwise, the method 300 may proceed to block 326. At block 324, one bit set to "1" may be sent in the bit stream. This may indicate to the decoder that the predicted group index number matches the actual group index number for the considered block. In this case, there may be no need to specify the predicted group number to the decoder since the decoder may be able to predict the intra mode for the considered block successfully. The method 300 may then end. Alternatively at block 326, one bit set to "0" may be sent in the bit stream. This may indicate to the decoder that the subsequent bit(s) in the bit stream specify the actual group index number for the considered block. At block 328, the group index number for the actual mode may be coded into one or two bits, as described above. At block 320, the coded group number may be sent into the bit stream. For example, using the formula above to code CurrentIndex, three bit may be set to "000" if CurrentGroup is 0. The method 300 may then end. In other embodiments, different bit values than described above may be used to code the group index number.

Figure 4:
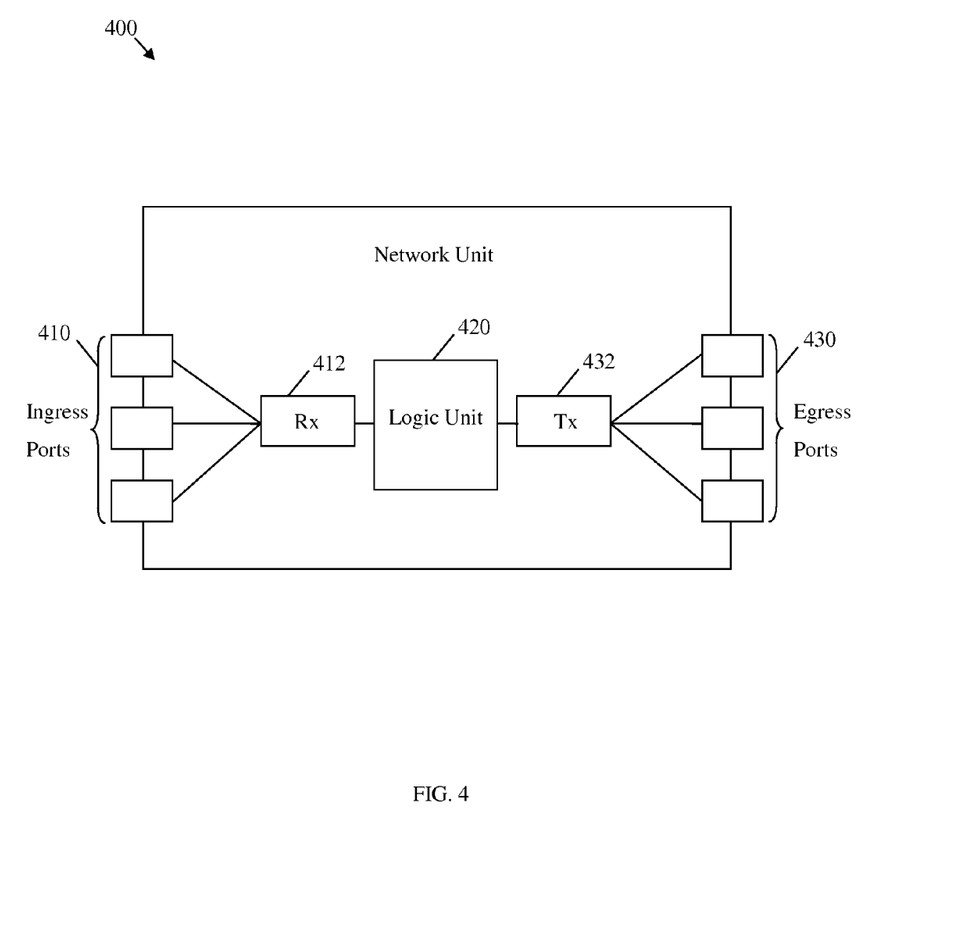
FIG. 4 is a schematic diagram of an embodiment of a network unit.

FIG. 4 illustrates an embodiment of a network unit 400, which may comprise any a processor or a video/image codec that processes images and predicts blocks as described above, e.g., within a network or system. For instance, the network unit 400 may correspond to a media controller at an image transmitter and/or receiver. The network unit 400 may comprise a plurality of ingress ports 410 and/or receiver units 412 for receiving data from other codecs, logic unit or processor 420 to process images and determine which codecs to send the data to, and a plurality of egress ports 430 and/or transmitter units 432 for transmitting data to the other codecs. The logic unit or processor 420 may be configured to implement any of the schemes described herein, including the MPS method 300 and may be implemented using hardware, software, or both.

Figure 5:
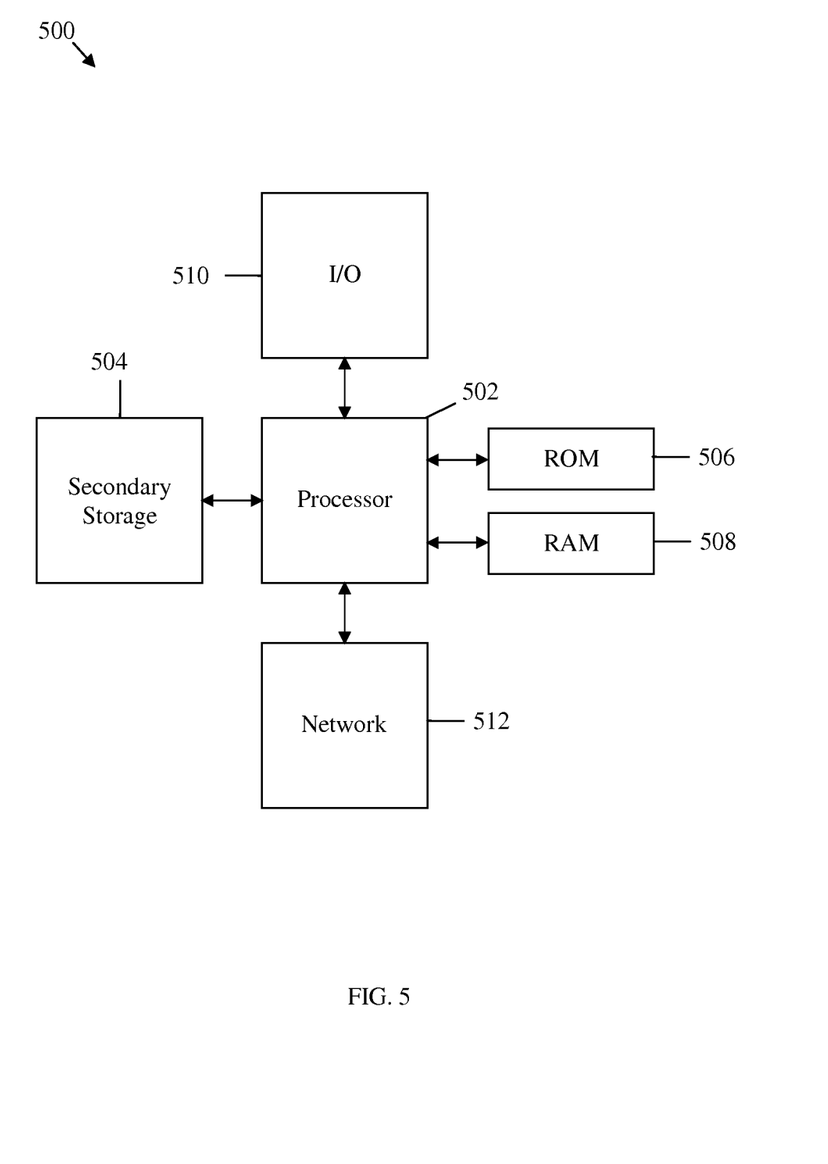
FIG. 5 is a schematic diagram of an embodiment of a general-purpose computer system.

The schemes described above may be implemented on any general-purpose network component, such as a computer or network component with sufficient processing power, memory resources, and network throughput capability to handle the necessary workload placed upon it. FIG. 5 illustrates a typical, general-purpose network component or computer system 500 suitable for implementing one or more embodiments of methods disclosed herein, such as the method 300. The general-purpose network component or computer system 500 includes a processor 502 (which may be referred to as a central processor unit or CPU) that is in communication with memory devices including secondary storage 504, read only memory (ROM) 506, random access memory (RAM) 508, input/output (I/O) 510 devices, and network connectivity devices 512. The processor 502 may be implemented as one or more CPU chips, or may be part of one or more application specific integrated circuits (ASICs) and/or digital signal processors (DSPs). The processor 502 may be configured to implement any of the schemes described herein, including the MPS method 300, which may be implemented using hardware, software, or both The secondary storage 504 is typically comprised of one or more disk drives or tape drives and is used for non-volatile storage of data and as an over-flow data storage device if RAM 508 is not large enough to hold all working data. Secondary storage 504 may be used to store programs that are loaded into RAM 508 when such programs are selected for execution. The ROM 506 is used to store instructions and perhaps data that are read during program execution. ROM 506 is a non-volatile memory device that typically has a small memory capacity relative to the larger memory capacity of secondary storage. The RAM 508 is used to store volatile data and perhaps to store instructions. Access to both ROM 506 and RAM 508 is typically faster than to secondary storage 504.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network component comprising:
   a memory; and
   a processor operably coupled to the memory and configured to predict an intra mode for a considered pixel block from a set of intra-frame modes comprising a plurality of directional intra modes and at least two non-directional intra modes arranged in a plurality of groups and indicated by a plurality of corresponding group numbers and group index numbers,
   wherein the intra mode of the considered pixel block is predicted based on the group numbers and group index numbers of a plurality of coded intra modes for a plurality of adjacent pixel blocks to the considered pixel block,
   wherein the set of intra-frame modes comprises 33 directional intra modes and 3 non-directional intra modes that are assigned 36 mode numbers from 0 to 35 and the corresponding group numbers and group index numbers as indicated in the table:

| Group Number | Group Index Number | | | | | | | | |
|---|---|---|---|---|---|---|---|---|---|
| | 0 | 1 | 2 | 3 | 4 | 5 | 6 | 7 | 8 |
| 0 | 0 | 1 | 2 | 3 | 4 | 5 | 6 | 7 | 8 |
| 1 | 11 | 16 | 34 | 14 | 10 | 12 | 13 | 15 | 17 |
| 2 | 22 | 30 | 35 | 18 | 19 | 23 | 25 | 28 | 9 |
| 3 | 21 | 29 | 32 | 26 | 20 | 24 | 33 | 27 | 31. |

2. The network component of claim 1, wherein the at least two non-directional intra modes comprise a Direct Current (DC) mode and a Planar mode.

3. The network component of claim 1, wherein the at least two non-directional intra modes comprise a Direct Current (DC) mode and a 2×2 Sub-block based intra mode.

4. The network component of claim 1, wherein the at least two non-directional intra modes comprise at least one of a Planar mode and a 2×2 Sub-block based intra mode.

5. The network component of claim 1, wherein the at least two non-directional intra modes comprise a Direct Current (DC) mode that has a mode number of 2, a Planar mode that has a group number of 34, and a 2×2 Sub-block based intra mode that has a group number of 35.

6. The network component of claim 1, wherein a group number corresponding to an actual intra mode for the considered pixel block is coded and sent if the predicted intra node does not match the actual intra mode.

7. The network component of claim 1, wherein a group number corresponding to an actual intra mode for the considered pixel block is received if the predicted intra mode does not match the actual intra mode.

8. The network component of claim 1, wherein the intra-frame nodes are grouped into four groups that each comprises 9 intra-frame modes.

9. The network component of claim 1, wherein the intra-frame modes are grouped into four groups that each comprises 5 intra-frame modes.

10. The network component of claim 1 further comprising a transmitter configured to send a group number of an actual intra mode for the considered pixel block if the actual intra mode does not match the predicted intra mode.

11. The network component of claim 1 further comprising a receiver configured to receive a group number of an actual intra mode for the considered pixel block if the actual intra mode does not match the predicted intra mode.

12. The network component of claim 1, wherein the at least two non-directional intra modes comprise a Direct Current (DC) mode that has a first group number and group index number combination, and a Planar mode that has a second group number and group index number combination.

13. A network component comprising:
a memory; and
a processor operably coupled to the memory and configured to predict an intra mode for a considered pixel block from a set of intra-frame modes comprising a plurality of directional intra modes and at least two non-directional intra modes arranged in a plurality of groups and indicated by a plurality of corresponding group numbers and group index numbers,
wherein the intra mode of the considered pixel block is predicted based on the group numbers and group index numbers of a plurality of coded intra modes for a plurality of adjacent pixel blocks to the considered pixel block,
wherein the set of intra-frame modes comprises 34 directional intra modes and 3 non-directional intra modes that are assigned 36 mode numbers from 0 to 36 and the corresponding group numbers and group index numbers as indicated in the table:

| Group Number | Group Index Number | | | | | | | | |
|---|---|---|---|---|---|---|---|---|---|
| | 0 | 1 | 2 | 3 | 4 | 5 | 6 | 7 | 8 |
| 0 | 0 | 1 | 2 | 3 | 4 | 5 | 6 | 7 | 8 |
| 1 | 11 | 16 | 34 | 14 | 10 | 12 | 13 | 15 | 17 |
| 2 | 22 | 30 | 35 | 18 | 19 | 23 | 25 | 28 | 9 |
| 3 | 21 | 29 | 36 | 26 | 20 | 24 | 33 | 27 | 31 |
| 4 | | | | | | | | | 32. |

14. A network component comprising:
a memory; and
a processor coupled to the memory and configured to predict an intra mode for a considered pixel block from a set of intra-frame modes comprising a plurality of directional intra modes and at least two non-directional intra modes arranged in a plurality of groups and indicated by a plurality of corresponding group numbers and group index numbers,
wherein the intra mode of the considered pixel block is predicted based on the group numbers and group index numbers of a plurality of coded intra modes for a plurality of adjacent pixel blocks to the considered pixel block,
wherein the set of intra-frame modes comprises 17 directional intra modes and 3 non-directional intra modes that are assigned 20 mode numbers and the corresponding group numbers and group index numbers as indicated in the table:

| Group Number | Group Index Number | | | | |
|---|---|---|---|---|---|
| | 0 | 1 | 2 | 3 | 4 |
| 0 | 0 | 1 | 2 | 3 | 4 |
| 1 | 5 | 16 | 34 | 7 | 12 |
| 2 | 11 | 8 | 35 | 14 | 10 |
| 3 | 13 | 9 | 36 | 15 | 6. |

* * * * *

UNITED STATES PATENT AND TRADEMARK OFFICE
CERTIFICATE OF CORRECTION

PATENT NO. : 9,667,987 B2  
APPLICATION NO. : 13/416766  
DATED : May 30, 2017  
INVENTOR(S) : Lingzhi Liu et al.

Page 1 of 1

It is certified that error appears in the above-identified patent and that said Letters Patent is hereby corrected as shown below:

On the Title Page

Item (75) Inventors:
Delete "Chenxiong Zhang, Plano, TX (US)" and insert -- Chen-Xiong Zhang, Plano, TX (US) --

Column 2, Line 3, item (56) References Cited, Other Publications, should read:
Li, et al, "CE6.a.5: Santa Clara University and Hisilicon Report on Block Based Intra Prediction,"
Joint Collaborative Team on Video Coding (JCT-VC) of ITU-T SG16 WP3 and ISO/IEC
JTC1/SC29/WG11, 4th Meeting: Daegu, KR, 20-28 January 2011, Document: JCTV-D026, 6 pages.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*